United States Patent [19]

Krumwiede et al.

[11] Patent Number: 4,565,560

[45] Date of Patent: Jan. 21, 1986

[54] ENERGY EFFICIENT AND ANTI-CORROSIVE BURNER NOZZLE CONSTRUCTION AND INSTALLATION CONFIGURATION

[75] Inventors: John F. Krumwiede; Yih-Wan Tsai, both of Allegheny County, Pa.

[73] Assignee: PPG Industries, Inc., Pittsburgh, Pa.

[21] Appl. No.: 683,749

[22] Filed: Dec. 19, 1984

[51] Int. Cl.$^4$ .............................................. C03B 5/04
[52] U.S. Cl. ...................................... 65/134; 65/356; 65/374.11; 432/160; 432/181
[58] Field of Search .................. 65/356, 374.1, 374.11, 65/134; 432/160, 181

[56] References Cited

U.S. PATENT DOCUMENTS

| | | | |
|---|---|---|---|
| 2,935,127 | 5/1960 | Stalego | 65/346 X |
| 3,515,529 | 6/1970 | Love et al. | 65/27 |
| 3,523,781 | 8/1970 | Levecque | 65/134 |
| 3,999,972 | 12/1976 | Brax | 65/337 |
| 4,294,603 | 10/1981 | Winzer et al. | 65/346 |
| 4,313,722 | 2/1982 | Yigdall | 432/1 |

Primary Examiner—Robert Lindsay

Attorney, Agent, or Firm—Robert A. Westerlund, Jr.

[57] ABSTRACT

A burner tip for passing fuel into a glass melting chamber, the burner tip having at least a portion thereof extending a distance into a fuel input passageway fluidly communicating the chamber interior to the chamber exterior, the distance being sufficient to minimize inspiration of chamber exterior or ambient air through an unsealed space formed between the outside surface of the burner tip and the walls forming the fuel input passageway, into the chamber interior, wherein at least the portion of the burner tip which extends into the fuel input passageway is made of high temperature, high oxidation-resistant material capable of withstanding the chamber interior atmosphere during both firing and off-firing cycles, while in direct contact therewith over a substantial time period. The input passageway-extending portion of the burner tip can be precoated with an inhibitor coating to minimize resistant material volitilization and to minimize reactions between the resistant material and refractory materials, especially refractory cement which may be employed to seal the unsealed space.

14 Claims, 4 Drawing Figures

ENERGY EFFICIENT AND ANTI-CORROSIVE BURNER NOZZLE CONSTRUCTION AND INSTALLATION CONFIGURATION

FIELD OF THE INVENTION

This invention relates to burner nozzles for passing fuel into a chamber, and more particularly, to burner nozzles which are capable of withstanding a hostile gaseous chamber environment of a glass melting furnace for a substantial period of time.

DISCUSSION OF THE TECHNICAL PROBLEM

In order to minimize energy expenditures, glass melting furnaces commonly utilize a pair of regenerator chambers to recycle exhaust gas heat, each chamber being positioned adjacent opposite furnace sidewalls and communicating with the melting chamber by a plurality of ports which communicate with the melting chamber at a level slightly above the level of the molten glass. Regenerative furnaces of this type operate in alternate cycles, with incoming air passing through the regenerator chamber on one side of the furnace to be preheated, then passing through the ports into the melting chamber. Fuel is added to the incoming air near the port mouths by burner nozzles positioned either in the port or adjacent the port mouth in the chamber sidewall. Flames issue a considerable distance into the chamber and hot exhaust gases pass into the opposite ports and through the opposite regenerator chamber, where considerable heat is extracted therefrom. After several minutes of operation, the cycle is reversed and incoming air is preheated by the previously extracted exhaust gas heat.

Burner nozzles used in such glass melting furnaces typically are constructed of metal and are positioned adjacent to but not in sealing contact with an aperture provided through a port wall. During the firing cycle of a particular port, a considerable volume of fuel passes at high velocity through the burner nozzle, which is generally spaced from the mouth of the aperture, into the port and thence, into the melting chamber, thus tending to cool the burner nozzle and protect it from the corrosive atmosphere within the chamber. However, due to the elevated temperature of the chamber gaseous atmosphere, the material of which burner nozzles have heretofore been constructed have required further cooling commonly provided by ambient air which is inspirated into the chamber through spaces between the burner nozzle and the aperture walls by the partial vacuum which is established by the moving fuel. Because inspirated air is neither preheated nor of a controlled volume, inspired air cooling as above-described is energy-inefficient and uneconomical.

Furthermore, during the off-firing cycle when the port is employed as an exhaust passage, the burner nozzles are subjected to very high temperatures and attack by the heated oxidizing or corrosive exhaust products, which include, among other components, particulate batch material and sulfate gases. In the temperature ranges, generally between about 2,300° F. (1200° C.) to 3,000° F. (1,700° C.), found near the port-mouth during the off-firing cycle, vagrant furnace exhaust gases will rapidly deteriorate the burner nozzles, a condition often referred to as sCting-out.

Broadly speaking, the prior art has advanced two general approaches for resolving the problems of rapid deterioration of burner nozzles by a hostile furnace atmosphere and energy inefficiencies and diseconomies caused by inspirated ambient air.

The first general approach has been to minimize contact between the exhaust products and the burner nozzles to minimize or eradicate deposits of corrosive exhaust products, e.g. batch material volatiles, on the burner nozzle surfaces. Exemplary of this approach are U.S. Pat. Nos. 3,515,529 and 2,935,127. U.S. Pat. No. 3,515,529, issued to Love et al., teaches a sophisticated burner nozzle which is rotated and covered by electromechanical means, during the off-firing cycle, to physically shield the nozzle from the hostile exhaust products. U.S. Pat. No. 2,935,127, issued to Stalego, teaches regulating or controlling the flow pattern of fuel and air from one regenerator into the combustion zone of the furnace and, consequently, the flow pattern of the combustion exhaust products from the combustion zone, through the burner ports, and into the opposite regenerator, to purportedly eliminate the deposition of volatiles and contaminants given off by the molten glass upon the burner nozzles.

The second general approach has been to shield burner nozzles from sting-out attack by exhaust products with fluid or air coolant means. A first manner of effectuating the second approach is to circulate cooling fluid through the burner nozzle with a velocity sufficient to cool and shield the burner nozzle from the hostile gaseous environment, as is taught in U.S. Pat. No. 4,313,722 issued to Yigdall. A second manner of carrying out the second approach is to pass cooling air through the burner nozzle during the off-firing phase of the combustion cycle, which technique is employed in a burner nozzle marketed by Combustion Tec., Inc. of Orlando, Fla.

Both approaches have the major disadvantage of being complex, expensive, and difficult to maintain. Further, regarding the Stalego teachings, controlling the flow pattern may result in combustion inefficiencies and/or premature burner nozzle deterioration. Both teachings described above to carry out the second approach have the drawback of potential water or air leakage, which would require repair or replacement of the burner nozzle, and/or combustion inefficiencies or energy diseconomies.

It would therefore be desirable and advantageous to have a burner nozzle which is simple and inexpensive to construct and maintain, which is energy-efficient, and which requires no cooling to survive the hostile gaseous atmosphere of a combustion furnace.

SUMMARY OF THE INVENTION

The present invention relates to a burner nozzle for passing fuel into a furnace chamber, including an elongated tube having at least an end portion or tip thereof made of a material which provides a continuously regenerated protective oxide coating. The burner tip is disposed within an aperture provided through a wall of a port which communicates with the chamber interior. The burner tip is not sealingly engaged with the aperture, so that the aperture communicates or fluidly interconnects the chamber interior and the chamber exterior or ambient air. The first end portion or tip of the burner nozzle is inserted a distance within the aperture sufficient to minimize the amount of ambient air inspirated through the aperture into the port and the chamber interior by the partial vacuum which is established by the fuel passing through the burner tip into the aperture at high velocity, thereby commensurately enhancing the energy efficiency and combustion efficiency of the furnace. With the burner nozzles presently available, this energy savings and combustion efficiency improvement could not be realized. This is because, with the above-described configuration, the direct exposure to the hostile chamber interior atmosphere would rapidly deteriorate and corrode the burner nozzle, primarily due to vulnerability to the high-temperature, corrosive nature of the chamber interior atmosphere. The burner nozzle of the present invention includes an end portion or tip which is capable of withstanding the hostile chamber interior atmosphere even when directly exposed thereto over a prolonged time period, because it is made of a material which provides a protective oxide coating which is highly resistant to high-temperature oxidization or corrosion. The burner tip material is further capable of continuously producing this protective oxide coating in response to previously-produced coating degeneration. Further, the burner nozzle end portion or tip can be pre-coated with a refractory inhibitor coating to minimize volatilization of the nozzle end portion or tip material and/or to minimize potential adverse reaction of the tip material with the adjacent refractory surfaces. Yet further, the pre-coated tip may be sealingly engaged with the aperture walls. In this instance, the inhibitor coating functions to minimize chemical reaction between the seal, e.g. refractory cement, and the burner nozzle end portion or tip material, which if not prevented or minimized, may produce "stones" or other defects in the product, e.g. glass, being melted in the furnace.

DESCRIPTION OF THE INVENTION

Figure 1:
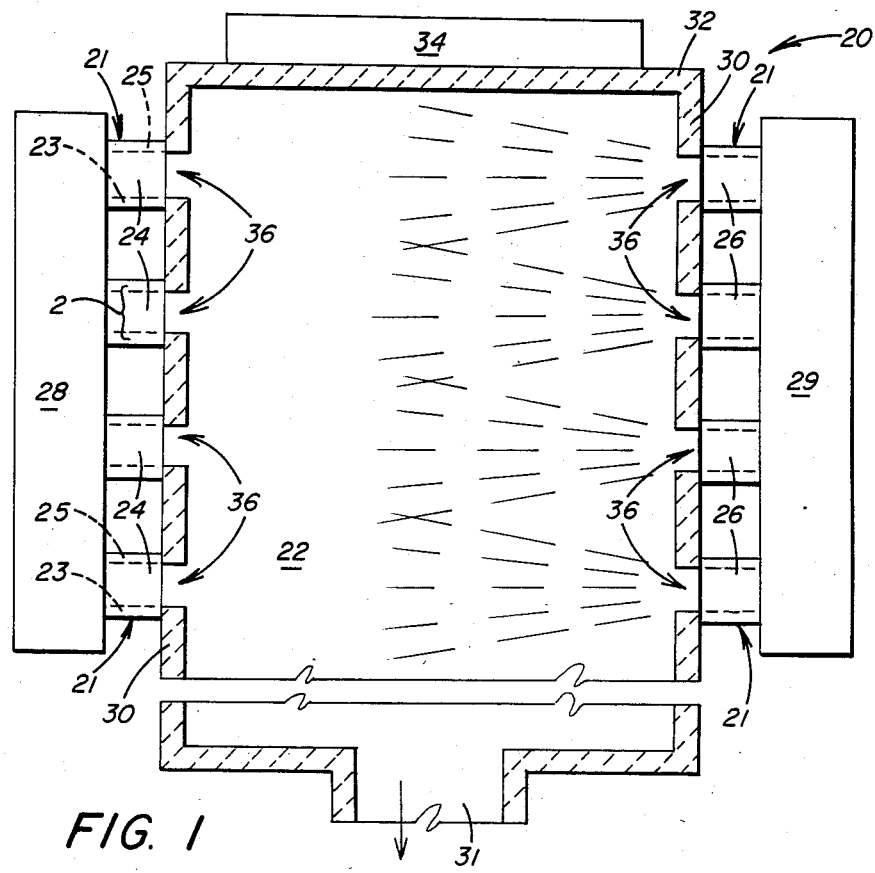
FIG. 1 is a plan view of a glass melting furnace showing right side ports during their firing cycle and left side ports during their exhaust or off-firing cycle.
Figure 2:
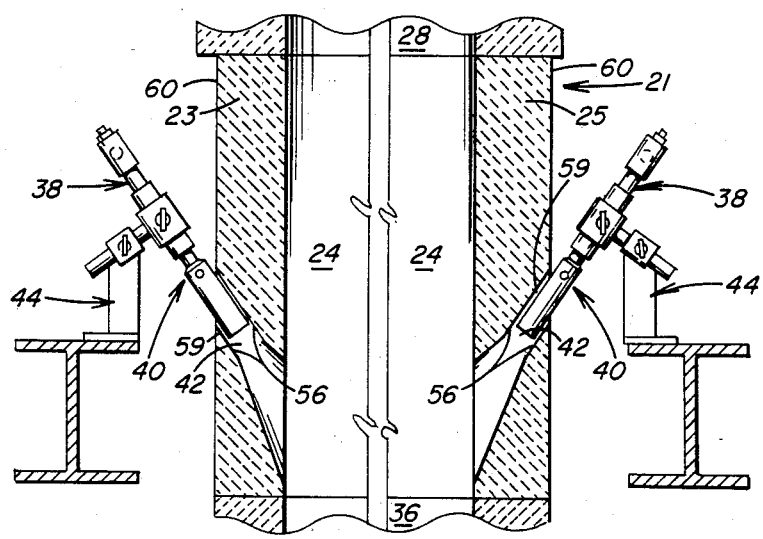
FIG. 2 is a plan view of the area 2—2 of FIG. 1 showing a burner nozzle assembly and installation configuration incorporating features of the present invention.

Referring to FIG. 1, there is shown a regenerative type glass melting furnace 20 of the type known in the glass manufacturing art, including a melting chamber 22, left side ports 24, right side ports 26, and left and right side regenerator chambers 28 and 29, respectively. Melting chamber 22 has a refractory bottom (not shown), a refractory roof (not shown), refractory sidewalls 30, refractory exit area 31, and a refractory backwall 32. Glass batch material is pushed through the backwall 32 by a batch feeder 34 into the melting chamber 22, floats upon a pool of molten glass and moves thereacross in the direction of the arrow until it has melted and become a part of the pool of molten glass. Quantities of molten glass are removed from the melting chamber 22 at the exit area 31 to maintain the pool of molten glass at a generally constant depth.

The interior of the melting chamber 22 is heated by the combustion of fuels mixed with sufficient quantities of air. Fuels which may be used in the practice of the invention include gaseous fuels, mixtures of atomized liquid fuels and air mixtures of powdered fuels and air. In a regenerative type furnace 21 of the type shown in FIG. 1, during the first half of the combustion cycle, air is passed into the melting chamber 22 from regenerator chamber 29 into ports 26 and therethrough into melting chamber 22, while combustion products are exhausted through ports 24 into regenerator chamber 28, where heat is extracted from the combustion products. During the second half of the cycle, the process is reversed, with air passing through regenerator chamber 28 and ports 24 into melting chamber 22, and with combustion products exhausted through ports 26 and regenerator chamber 29. The air is preheated to a substantial degree as it passes through a heated regenerator chamber 28 or 29 into the melting chamber 22, thus improving furnace energy efficiency. Hereinafter, ports which are passing air into the melting chamber are in their "firing cycle" and ports passing combustion products are in their "off-firing" or exhaust cycle", e.g. in FIG. 1, ports 26 are in their firing cycle and ports 24 are in their exhaust cycle.

Figure 3:
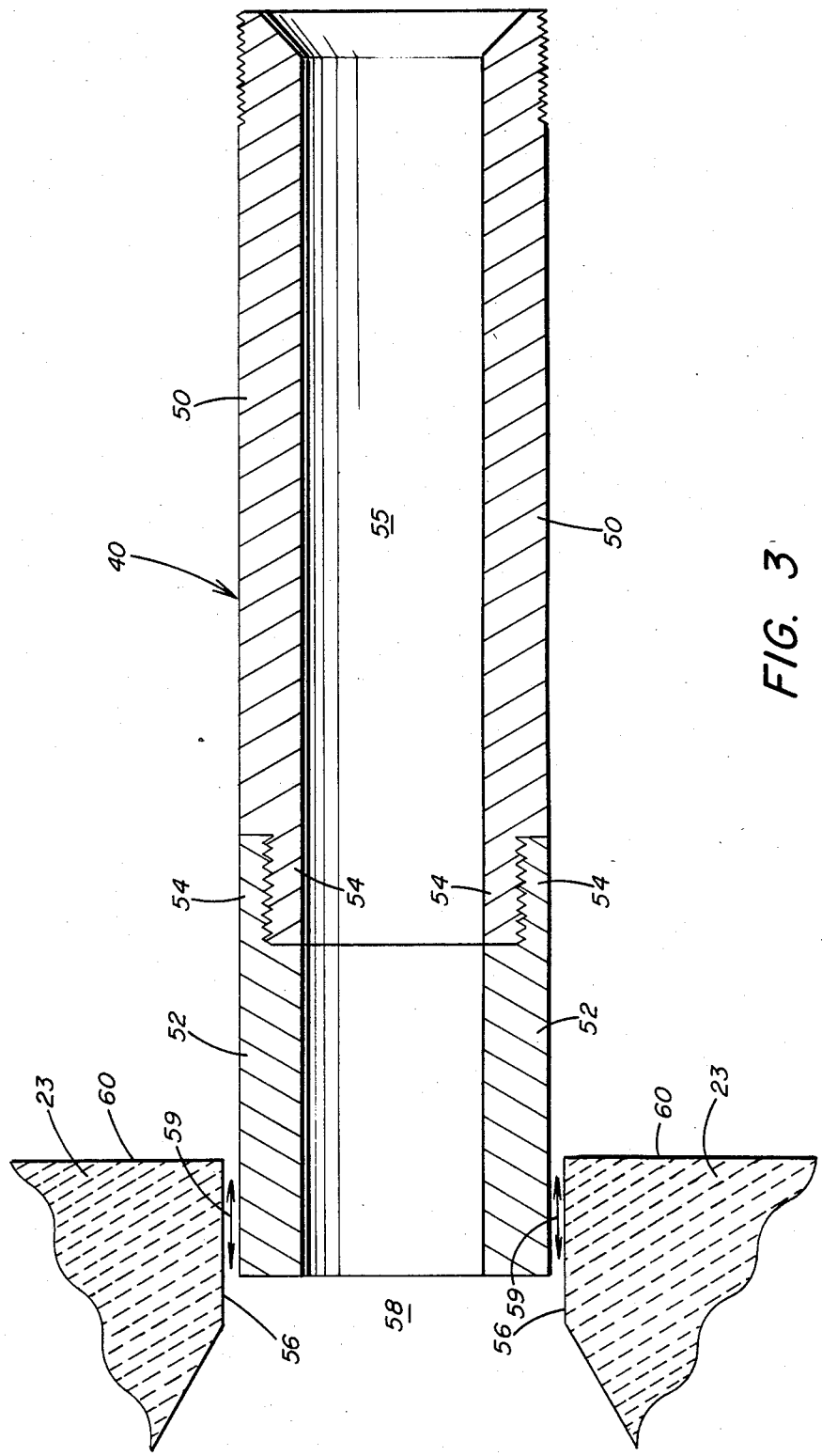
FIG. 3 is a side, elevational, cross-sectional view of a burner nozzle incorporating features of the present invention shown partially in isolation.

Referring to FIG. 3, the burner nozzle 40 which is representative of all of the burner nozzles 40, is an elongated pipe or tube comprised of a main body section 50 and an end portion body section or burner tip 52, each having a threaded flange portion 54 at an end thereof, the threaded flange portions 54 being threadedly mated to connect the main body section 50 with the burner tip 52, to thereby form a continuous, elongated fuel pipe or burner nozzle 40. Although not limiting to the invention, the main body section 50 is preferably constructed of a mild steel, e.g. carbon steel, or any other convenient strong and durable material. The end portion body section or tip 52, in accordance with the present invention, is constructed of a material which is characterized by the property of inherently, continuously producing an adherent, (rather than exfoliating), oxide coating in covering relationship to its outer surface, sufficient to withstand the high-temperature, highly corrosive atmosphere of the chamber 22, even while in direct contact therewith during both the firing and exhaust cycle of the port 24 or 26, over a prolonged time period, e.g. ½ to 1½ years, dependent upon furnace type and furnace operating parameters. In the actual practice of the invention, 330 stainless steel sold by Rolled Alloys, Inc. under their trademark RA 330 TX ® Stainless Steel was employed. This is a high alloy content stainless steel, comprising by weight:

34–37% Nickel
17–20% Chromium
1–1½% Silicon
40–44% Iron
1½–2% Manganese
≦0.03% Phosphorus
≦0.08% Carbon
≦0.03% Sulphur The main body section 50 is externally threaded at its end opposite its threaded flange portion 54 for convenient attachment to the fuel supply line 38. The burner nozzles 40 are secured by any convenient supporting facilities, e.g. mount 44, in such a manner that a tolerance or unsealed space 59 is established between the outside circumferential surface of the burner nozzle 40 and the refractory walls 56 of the port tunnel 21 which define the aperture 42 through which at least a portion of the burner tip 52 is inserted.

In the actual practice of the present invention, the inside diameter of the burner nozzles 40 is about 1¾" (4.45 cm.), the outside diameter of the burner nozzles 40 is about 2¾" (6.99 cm.) and the diameter of the aperture 42 is about 3" (7.62 cm.). Therefore, the thickness of the walls of the burner nozzles 40 is about 1" (2.54 cm.) and the dimension of the unsealed space 59 between the outside surfaces of the burner nozzles 40 and the refractory walls 56 of the port tunnels 21 which form the apertures 42, is about ⅛" (0.32 cm.). In the practice of this invention, the burner tips 52 extend about 1½" (3.81 cm.) interiorly of the outside walls 60 of the port tunnel structures 21. With the above-described burner nozzle 40 installation employed in the actual practice of this invention, considerable fuel/energy savings are realized and combustion efficiency is substantially improved relative to the conventional configuration wherein the burner nozzle 40 does not at all extend, for all intents and purposes, interiorly of the port tunnel structure 21 outside wall 60. Further, in the actual practice of this invention, the burner tip 52 is approximately 4 inches (10.16 cm.) in length and the burner nozzle 40 main body section 50 is approximately 8½ inches (21.60 cm.) long, the overlappingly mating threaded flange portion 54 of the sections 50, 52 being approximately 1 inch (2.54 cm.) long, and the overall length of the burner nozzle 40 being about 11½ inches (29.21 cm.).

Although it is not completely understood, it is believed that the silicon constituent rapidly reacts with the chromium constituent of the 330 stainless steel material at the elevated chamber 22 interior temperatures to produce a protective oxide coating covering the outside surface of the burner tip 52. It is further believed that the above reaction takes place continuously within the hostile chamber interior atmosphere, to thereby continuously, rapidly regenerate the protective oxide coating which is being continuously attacked or deteriorated by the high-temperature, highly corrosive chamber 22 interior atmosphere.

Figure 4:
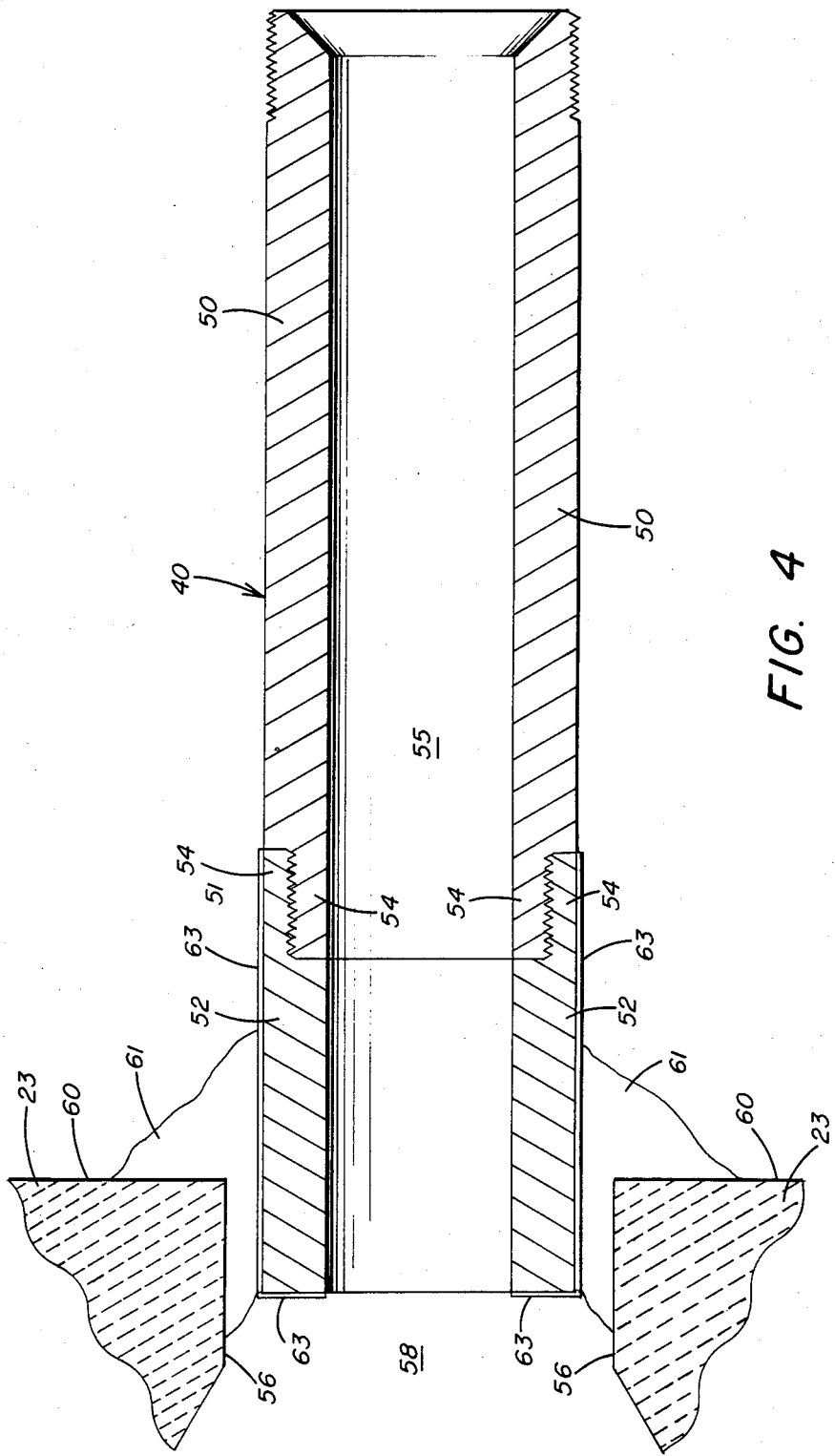
FIG. 4 is an alternate embodiment of the burner nozzle of this invention, shown in a view similar to FIG. 3.

Referring now to FIG. 4, there can be seen an alternative embodiment of the present invention, in which the unsealed space 59 between the outside surface of the burner nozzle 40 and the refractory walls 56 of the port tunnel structures 21 which form the apertures 42 through which the burner tips 52 are inserted, is sealed with suitable sealing means, preferably a refractory cement 61, to thereby prevent the inspiration of chamber exterior or ambient air into the chamber 22 interior, to thereby even further improve furnace combustion and fuel/energy efficiency. With this embodiment, the burner tip 52 is pre-coated (i.e. prior to installation within the aperture 42) with an inhibitor coating 63, preferably a refractory coating, over substantially the entire outside surface area thereof, to minimize volatilization of the burner tip 52 material, e.g. especially the chrome component of the 330 stainless steel material, and to further minimize chemical reactions between the burner tip 52 material and the sealing means, especially at elevated temperatures, e.g. above 2,000° F. (1100° C.). A preferred refractory/inhibitor coating 63 is $Zr_2O_2$, or zirconia, which is believed to, although this is not fully understood, minimize chrome volatilization and reactions between the 330 stainless steel and the refractory cement 61, which if not prevented or minimized, may produce chrome-spinel stones, or other adverse by-products, which may produce defects in the glass produced from the molten glass within the melting chamber 22 of the furnace 20. It is further believed that the refractory inhibitor coating 63 also serves to increase the useful life of the burner tip 52. It is preferred that the zirconia coating 63 be flame-sprayed onto the outside surface of the burner tip 52.

It is to be understood that the present invention is not limited to the specific forms herein disclosed, as the invention may be practiced with other melting chamber configurations with beneficial results. The scope of the present invention should be interpreted solely on the basis of the appended claims, which should be interpreted to include within their scope all departures therefrom which fall within the spirit thereof.

What is claimed is:

1. In a glassmaking furnace of the type comprising a combustion chamber, and a plurality of port tunnel structures disposed in fluid communication with the combustion chamber, an apparatus for passing fuel into the combustion chamber, comprising:
    a fuel input passageway provided through a wall of at least one of said port tunnel structures;
    a burner nozzle extending at least partially into said fuel input passageway for delivering fuel through said fuel input passageway into the combustion chamber; and
    wherein the diameter of said burner nozzle is lesser than the diameter of said fuel input passageway, to thereby provide a space between said burner nozzle and said fuel input passageway, said space being unsealed in direct communication with the ambient atmosphere about the furnace, and wherein further said space is sufficient to allow inspiration of enough ambient air to cool said burner nozzle.

2. The apparatus as set forth in claim 1, wherein at least the portion of said burner nozzle which extends into said fuel input passageway is constructed of a high-temperature, highly corrosion-resistant material.

3. The apparatus as set forth in claim 2, wherein said high-temperature, highly corrosion-resistant material is characterized by the property of continuously, rapidly producing and regenerating a protective, adherent oxide coating in covering relationship to at least the surface portions of said burner nozzle which extend into said fuel input passageway.

4. The apparatus as set forth in claim 2, wherein said burner nozzle comprises:
    a first portion comprising at least said portion of said burner nozzle which extends into said fuel input passageway;
    a second portion; and
    means for connecting said first and second portions.

5. The apparatus as set forth in claim 2, wherein said first portion extends at least about 1 inch (2.54 cm.) into said fuel input passageway.

6. The apparatus as set forth in claim 5, wherein said unsealed space is less than about ¼ inch (0.64 cm.).

7. The apparatus as set forth in claim 2, wherein it further comprises means for sealing said unsealed space.

8. The apparatus as set forth in claim 7, wherein it further comprises means for minimizing volatilization of said highly corrosion-resistant material and furnace refractory materials.

9. The apparatus as set forth in claim 8, wherein said minimizing means comprises an inhibitor coating disposed in overlying relation to said highly corrosion-resistant material.

10. The apparatus as set forth in claim 9, wherein said inhibitor coating comprises $Z_2O_2$ or zirconia.

11. The apparatus as set forth in claim 7, wherein said sealing means comprises refractory cement.

12. The apparatus as set forth in claim 3, wherein said highly corrosion-resistant material comprises nickel, chromium, iron, and silicon.

13. The apparatus as set forth in claim 12, wherein said highly corrosion-resistant material further comprises manganese, phosphorus, carbon, and sulfur, in the following proportions:
- 34–37% Nickel;
- 17–20% Chromium;
- 40–44% Iron;
- 1½–2% Manganese;
- 1–1½% Silicon;
- ≦0.03% Phosphorus;
- ≦0.08% Carbon; and
- ≦0.03% Sulfur.

14. A method for passing fuel into a combustion chamber of a glassmaking furnace of the type having a plurality of port tunnel structures disposed in fluid communication with the combustion chamber, comprising the steps of:
- providing a burner nozzle;
- providing a fuel input passageway through a wall of one of said port tunnel structures;
- inserting said burner nozzle to extend into said fuel input passageway;
- passing fuel through said burner nozzle at a velocity sufficient to create at least a partial vacuum within said fuel input passageway; and
- providing an unsealed space between said burner nozzle and said fuel input passageway in direct communication with the ambient atmosphere external to the furnace, whereby said at least partial vacuum causes inspiration of enough ambient air to cool said burner nozzle, in order to extend the life of said burner nozzle.

* * * * *